UNITED STATES PATENT OFFICE.

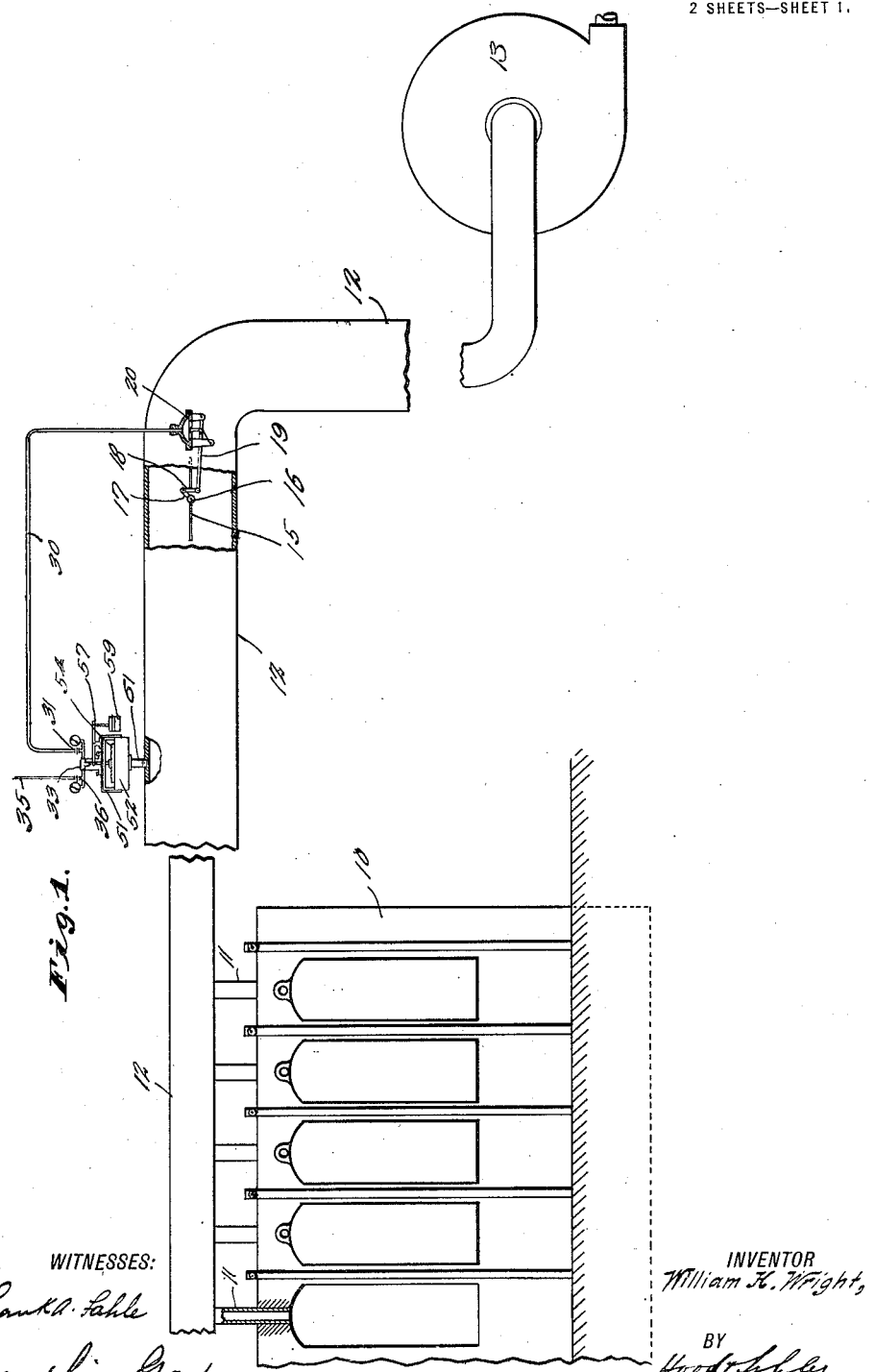

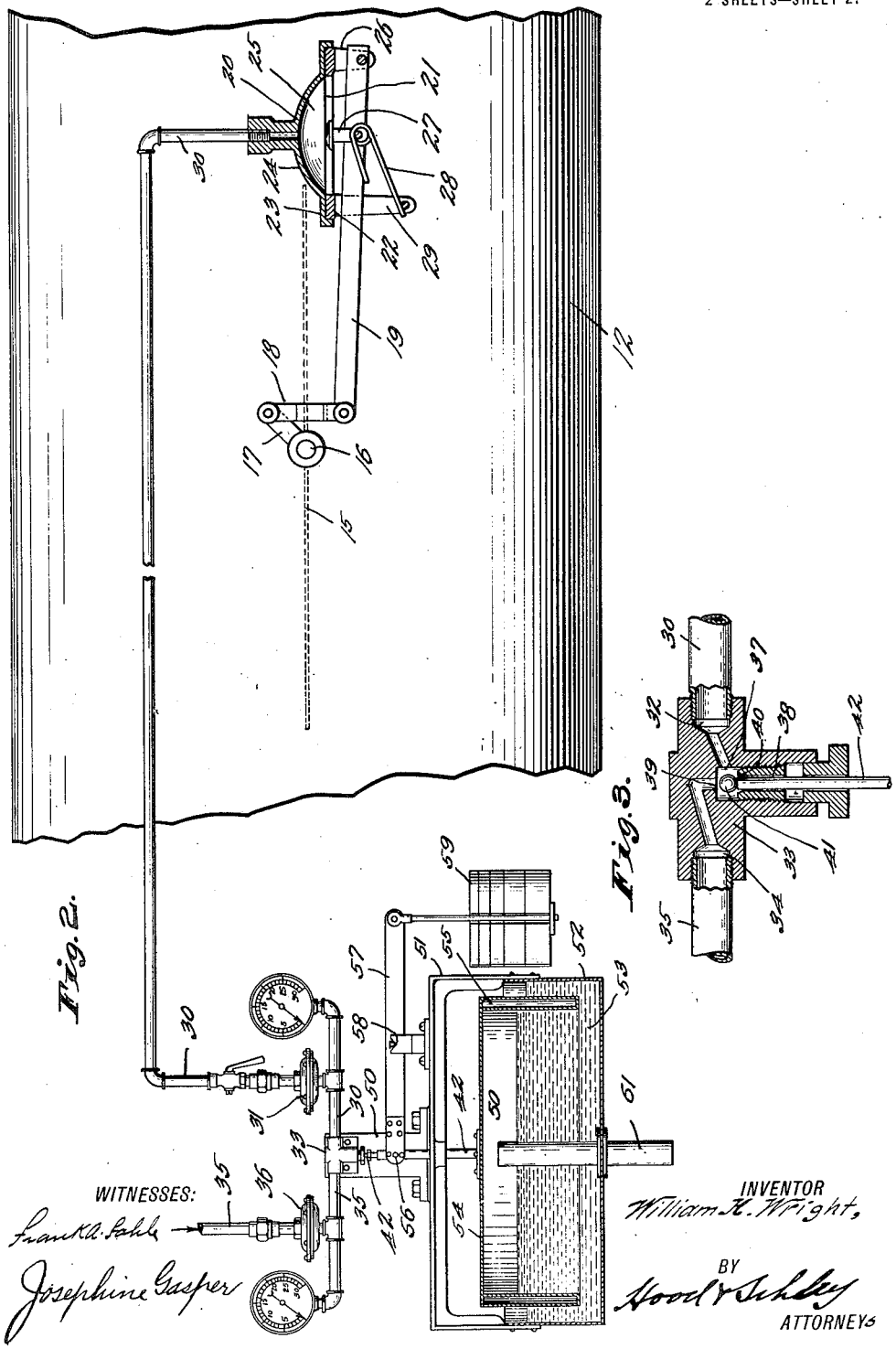

WILLIAM H. WRIGHT, OF INDIANAPOLIS, INDIANA, ASSIGNOR TO C. J. TAGLIABUE MANUFACTURING COMPANY, OF BROOKLYN, NEW YORK, A CORPORATION OF NEW YORK.

PRESSURE-GOVERNOR FOR GAS-MAINS.

1,313,447.             Specification of Letters Patent.      Patented Aug. 19, 1919.

Application filed January 15, 1916. Serial No. 72,199.

*To all whom it may concern:*

Be it known that I, WILLIAM H. WRIGHT, a citizen of the United States, residing at Indianapolis, in the county of Marion and State of Indiana, have invented a new and useful Pressure-Governor for Gas-Mains, of which the following is a specification.

In the manufacture of coke and gas from coal, it is necessary that the pressure condition in the oven offtake main be maintained constant within exceedingly close limits, in order to produce the best results; and it is the object of my present invention to provide a regulator which will automatically do this with great precision and positiveness; will act with great sensitiveness to correct any error, however small, without any of that inoperative travel which in many regulators determines the limits of sensitiveness of the device; and will act with a force and speed substantially proportional to the error to be corrected.

In carrying out my invention, I provide a device which controls the pressure condition produced in the oven offtake main by the exhauster, and operate this device by a fluid-pressure motor, preferably a diaphragm motor, which is subjected to a fluid-pressure condition derived from any suitable source and controlled by a control valve which has no inoperative travel and controls the size of the connection between such source and the fluid-pressure motor and also oppositely controls the size of a leakage connection from said fluid-pressure motor, conveniently to the atmosphere if the fluid used is air; and I govern the position of this control valve by a bell floating in liquid and subjected to a vertically acting force varying with its depth of immersion, preferably by a variably immersed buoyancy chamber, this buoyed bell conveniently having an adjustable counterweight for balancing; and I connect an inclosed space vertically on one side of this buoyed bell, most conveniently above the liquid below it, with the oven offtake main so that the pressure in such space is that of such main, the space vertically on the other side of such buoyed bell preferably being under atmospheric pressure. As the pressure in the oven offtake main varies, the buoyed bell rises or falls correspondingly as a delicate pressure gage and operates the control valve without inoperative travel to control the supply of fluid to and the leakage of fluid from the line leading to the fluid-pressure motor so as to vary the effective fluid pressure supplied to such motor to cause the motor to operate such device to correct for the variation in pressure in the oven offtake main. The device I have illustrated for making this correction, and the one I now prefer when more than one battery of ovens are connected to the same exhauster, is a damper in the connection between the oven offtake main and the exhauster.

I am aware that it is old to have a diaphragm motor which has the effective fluid pressure exerted thereon controlled by a control valve which varies the size of the supply passage from a source of fluid pressure and the size of a leakage passage to the atmosphere, and to control such control valve by a fluid-responsive device; but in such prior devices it was impossible to maintain a pressure with the sensitiveness, or anything approaching the sensitiveness, necessary in the oven offtake main of the coke oven. I am also aware that fluid-responsive devices of the gas holder type have been used for various purposes; but so far as I know they have not been used in a system such as required by my invention.

The accompanying drawings illustrate my invention. Figure 1 is a diagrammatic view showing part of a coke and gas plant in which the oven offtake main is equipped with the preferred form of my invention; Fig. 2 is an enlarged partly structural and partly diagrammatic view showing the features of my invention more in detail; and Fig. 3 is a sectional detail view of the control valve.

A battery of coke ovens 10, of any desired type, discharge by their individual risers 11 into the usual oven offtake main 12, which is shown on two different scales in Fig. 1. This oven offtake main 12 is suitably connected to the usual exhauster 13, which maintains a suitable pressure condition in the oven offtake main and discharges the gas for any suitable further treatment. Between the exhauster 13 and the nearest of the risers 11 is located a damper 15, which is an ordinary butterfly valve mounted on a shaft 16. Fixed on the shaft 16 outside the oven offtake main is an arm 17, which is connected by a link 18 to the operating lever 19 of a diaphragm motor 20. This diaphragm motor has a suitable flexible diaphragm 21, preferably of rubber, which is clamped at its edge between an annulus 22 and the annular flange 23 of the main shell 24 which is concave on the inside so as to provide with the diaphragm 21 a pressure chamber 25. The lever 19 is pivoted to a pair of fingers 26 projecting downward from the annulus 22, and has pivoted to it a pin 27 the upper end of which bears against the under side of the diaphragm 21 at its center and is preferably flared to provide a footing of considerable area where it engages such diaphragm. The lever 19 and diaphragm 21 are yieldingly pressed upward by a spring 28 which acts between such lever 19 and pins on a pair of guide fingers 29 projecting downward from the annulus 22 on opposite sides of the lever 19. When the diaphragm 21 and lever 19 move upward they produce an opening of the damper 15, and when they move downward they produce a closing of such damper.

The pressure chamber 25 of the diaphragm motor is connected by a pipe 30 through a filter 31 to the outlet port 32 of the control valve 33. The inlet port 34 of this control valve is connected by a pipe 35 through a filter 36 to any suitable source of fluid pressure, such as an air compressor or compressed air tank, maintaining a substantially constant pressure. The ports 32 and 34 are connected by suitable passages to a central valve chamber 37 within the control valve 33; which valve chamber is also connected by a leakage passage 38 to the atmosphere or other point of leakage discharge. The passages from the inlet port 34 and the leakage passage 38 enter the chamber 37 from directly opposite points, and where they enter such chamber are provided with valve seats 39 and 40, between which is a ball 41 which is movable between such two valve seats to control them oppositely. The passage from the outlet port 32 enters the chamber 37 from a lateral point out of the path of the ball 41, so that it is always in free communication with such chamber. A valve stem 42 extends loosely through the leakage passage 38, so as not to interfere with leakage therethrough, and engages the ball 41, the ball being pressed against the end of such valve stem 42 by the air pressure from the air supply pipe 35. The position of the ball 41 is thus dependent upon the position of the valve stem 42, so that by pushing the valve stem 42 inward the air supply is diminished and the air leakage increased to diminish the effective pressure in the chamber 25 and by allowing the valve stem 42 to be moved outward the air supply is increased and the air leakage decreased to increase the effective pressure in the chamber 25.

The control valve 33 is mounted on a bracket 50 carried by a bridge member 51 mounted on a water container 52, dipping into the water 53 within which is a floating bell 54 to the top of which the valve stem 42 is rigidly attached. The valve stem 42 may have a guide mounting in the bridge member 51. The bell 54 has double outer walls so as to provide an annular buoyancy chamber 55, which may be closed at the bottom though it is not necessarily so. By reason of the buoyancy chamber 55, the bell 54 is forced upward by the hydrostatic pressure with a force varying lirectly as the depth of immersion. The valve stem 42 is connected by a pivot pin 56 to a weight lever 57 having a central pivotal support 58 and carrying at its end opposite the pivot pin 56 an adjustable suspended weight 59, which thus also tends to force the valve stem 42 and buoyed bell 54 upward. The space 60 above the water level under the buoyed bell 54 is connected by a pipe 61 to the oven offtake main 12 at a point between the risers 11 and the damper 15, so as to be responsive to the pressure in such oven offtake main. The top of the buoyed bell is under atmospheric pressure.

In operation, the exhauster 13 maintains a definite pressure condition, in most cases a partial vacuum, in the oven offtake main 12 in the usual manner. This same partial vacuum exists in the space 60. Upon any variation in such partial vacuum, there is a like variation in the space 60, and this variation destroys the equilibrium existing on the buoyed bell 54 and causes such buoyed bell to move upward by the excess of offtake main pressure when the partial vacuum decreases (or the absolute pressure increases) and to move downward by the excess of atmospheric pressure when the partial vacuum increases (or the absolute pressure decreases). The upward or downward movement of the buoyed bell 54 decreases or increases respectively the buoyant effect or lifting force of the buoyant chamber 55, so as to tend to re-create the equilibrium existing on the buoyed bell 54, the movement of such bell continuing until such equilibrium is again established. The buoyed bell 54 may be made very sensitive in its movements, and in actual practice I have obtained a movement of over half an inch for a variation of pressure of one millimeter of water. The valve stem 42 moves with the buoyed bell 54, moving the ball 41 toward the valve seat 39 when the bell 54 rises and allowing the ball 41 to move toward the valve seat 40 when the buoyed bell 54 falls. As the total movement of the ball 41 is quite small, less than one-eighth of an inch, a variation in the oven offtake main pressure of but a small fraction of a millimeter of water will produce a movement of the ball 41 from the seat 39 to the seat 40 or vice versa. The position of the ball 41 determines the pressure in the valve chamber 37, by varying relatively the air supply thereto and the leakage therefrom; and so likewise controls the pressure in the pressure chamber 25 of the diaphragm motor, and causes such diaphragm motor to turn the damper 15 as required. Ordinarily, the valve 41 floats between the two seats 39 and 40, and moves only very slightly one way or the other, the air pressure from the pipe 35 holding the ball tightly against the end of the valve stem 42, so that the valve follows closely the movements of such stem and there is no inoperative travel. When the partial vacuum in the oven offtake main 12 rises (or the absolute pressure falls), the buoyed bell 34 descends and the ball 41 is forced closer to the valve seat 40 and farther away from the valve seat 39, thus increasing the air supply and decreasing the air leakage and thereby increasing the pressure in the pressure chamber 25 of the diaphragm motor and causing the center of the diaphragm 21 to be moved downward against the spring 28 to force the lever 19 downward and turn the damper 15 in a clockwise direction (Figs. 1 and 2) to close it slightly and thus decrease the passageway to the exhauster 13 and thereby reduce the partial vacuum (or increase the absolute pressure) in the oven offtake main, so as to correct for the variation which caused this series of movements. Similarly, when the partial vacuum in the oven offtake main 12 falls (or the absolute pressure rises), the buoyed bell 54 ascends and the ball 41 is forced closer to the valve seat 39 and farther away from the valve seat 40, thus decreasing the air supply and increasing the air leakage and thereby decreasing the pressure in the pressure chamber 25 of the diaphragm motor and causing the center of the diaphragm 21 to be moved upward by the spring 28 to force the lever 19 upward and turn the damper 15 in a counterclockwise direction (Figs. 1 and 2) to open it slightly and thus increase the passageway to the exhauster 13 and thereby increase the partial vacuum (or reduce the absolute pressure) in the oven offtake main, so as to correct for the variation which caused this series of movements. By reason of the sensitiveness of the device, the pressure within the oven offtake main 12 may be maintained substantially at the desired constant value, the ordinary variation in such pressure never exceeding one or two tenths of a millimeter of water. However, whenever there is a variation, the movement of the buoyed bell 54 and of the ball 41 corresponds in amount to such variation in pressure, so as to produce an immediate and corresponding variation in the pressure chamber 25 of the diaphragm motor and a movement of the damper 15 by a force and at a speed substantially proportional to the variation from normal causing such movement. There is no fixed relation between the position of the damper 15 and that of the buoyed bell, and the position of the buoyed bell is not varied by the movement of the damper save as a result of a change in the pressure in the offtake main as a result of such movement; and the damper movement continues, with gradually decreasing speed as the pressure in the oven offtake main returns toward normal, until such pressure, and therefore the buoyed bell, reach such normal. The pressure in the oven offtake main may be maintained constant by my device within the limits of the variation in atmospheric pressure produced by changes in wind velocity.

While I have described my invention in some detail and for a particular application, it is not limited to such detail and application save where expressly stated in the claims.

I claim as my invention:

1. In combination, a coke oven, an offtake main receiving gas from said coke oven, an exhauster connected to said oven offtake main, a damper controlling the connection between said exhauster and said oven offtake main, a fluid-pressure motor for operating said damper, a control valve controlling the pressure acting on said fluid-pressure motor, a bell floating in a liquid and operating said control valve, and a connection from an inclosed space vertically on one side of said bell to said oven offtake main, so that the pressure in such space corresponds to that in the oven offtake main, said bell being provided with a variably immersed buoyancy chamber whereby the buoyancy of the liquid on the bell is increased with the depth of immersion of the latter.

2. In combination, a coke oven, an offtake main receiving gas from said coke oven, an exhauster connected to said oven offtake main, a damper controlling the connection between said exhauster and said oven offtake main, a fluid-pressure motor for operating said damper, a control valve controlling the pressure acting on said fluid-pressure motor, a bell floating in a liquid and operating said control valve, a connection from an inclosed space vertically on one side of said bell to said oven offtake main, so that the pressure in such space corresponds to that in the oven offtake main; and means for producing on said bell a vertically acting force varying with the extent to which the bell is immersed.

3. In combination, a coke oven, an offtake main receiving gas from said coke oven, an exhauster connected to said oven offtake main, a damper controlling the connection between said exhauster and said oven offtake main, a fluid-pressure motor having a pressure chamber bounded on one side by a flexible diaphragm which is connected to said damper to operate it, said diaphragm being spring-pressed in one direction, a valve chamber connected to said pressure chamber, valved connections from said valve chamber to a source of fluid-pressure and to a waste respectively, a bell floating in liquid and operatively connected to actuate said valved connections oppositely as the level of the bell varies so as to vary oppositely the sizes of the supply to and waste from the valve chamber and therefore to vary the pressure in the pressure chamber, and a connection from an inclosed space vertically on one side of said bell to the oven offtake main whereby the bell rises and falls to vary the valved connections as the pressure condition in the oven offtake main changes, said bell being provided with a buoyancy chamber which is variably immersed as the bell rises and falls so as to vary the buoyant effect of the liquid on the bell.

4. In combination, a gas main, pressure-maintaining means connected to said gas main, a damper in the connection between said gas main and said pressure-maintaining means, a fluid-pressure motor having a pressure chamber bounded on one side by a flexible diaphragm which is connected to said damper to operate it, said diaphragm being spring-pressed in one direction, a valve chamber connected to said pressure chamber, connections from said valve chamber to a source of fluid pressure and to a waste respectively, a valve member oppositely controlling the openings from both said connections to said valve chamber, a bell floating in liquid and operatively connected to actuate said valve member to vary said openings oppositely as the level of the bell varies so as to vary oppositely the sizes of the supply to and waste from the valve chamber and therefore to vary the pressure in the pressure chamber, and a connection from an inclosed space vertically on one side of said bell to the gas main whereby the bell rises and falls to move said valve member as the pressure in the gas main changes, said bell being provided with a buoyancy chamber which is variably immersed as the bell rises and falls so as to vary the buoyant effect of the liquid on the bell.

5. In combination, a coke oven, an offtake main therefrom, an exhauster connected to said oven offtake main, a bell floating in liquid and provided with a buoyancy chamber which increases in buoyant effect as the depth of immersion of such bell increases, a connection from an inclosed space vertically on one side of said bell to said oven offtake main so that the pressure in such space corresponds to that in said oven offtake main, a control valve operated by said bell, a fluid-pressure motor having the fluid pressure acting on it controlled by said control valve, and means operated by said fluid-pressure motor for varying the pressure condition produced in said oven offtake main by said exhauster.

6. In combination, a coke oven, an offtake main therefrom, an exhauster connected to said oven offtake main, a bell floating in liquid, means for producing on said bell a vertically acting force varying with the extent to which the bell is immersed, a connection from an inclosed space vertically on one side of said bell to said oven offtake main so that the pressure in such space corresponds to that in said oven offtake main, a control valve operated by said bell, a fluid-pressure motor having the fluid pressure acting on it controlled by said control valve, and means operated by said fluid-pressure motor for varying the pressure condition produced in said oven offtake main by said exhauster.

7. In combination, a coke oven, an offtake main therefrom, an exhauster connected to said oven offtake main, a bell floating in liquid and provided with a buoyancy chamber which increases in buoyant effect as the depth of immersion of such bell increases, a connection from an inclosed space vertically on one side of said bell to said oven offtake main so that the pressure in such space corresponds to that in said oven offtake main, a control valve operated by said bell, said control valve having connections to a source of fluid pressure and a waste and an outlet and having its connections to the source of fluid pressure and the waste varied oppositely by movements of said bell, a fluid-pressure motor having the fluid pressure acting on it controlled by said control valve, said fluid-pressure motor having a chamber of variable size connected to the outlet of said control valve and varying in size as the pressure within it varies, and means dependent upon the size of said chamber of variable size for varying the pressure condition produced in said oven offtake main by said exhauster.

8. In combination, a coke oven, an offtake main therefrom, an exhauster connected to said oven offtake main, a bell floating in liquid, means for producing on said bell a vertically acting force varying with the extent to which the bell is immersed, a connection from an inclosed space vertically on one side of said bell to said oven offtake main so that the pressure in such space corresponds to that in said oven offtake main, a control valve operated by said bell, said control valve having connections to a source of fluid pressure and a waste and an outlet and having its connections to the source of fluid pressure and the waste varied oppositely by movements of said bell, a fluid-pressure motor having the fluid pressure acting on it controlled by said control valve, said fluid-pressure motor having a chamber of variable size connected to the outlet of said control valve and varying in size as the pressure within it varies, and means dependent upon the size of said chamber of variable size for varying the pressure condition produced in said oven offtake main by said exhauster.

9. In combination, a coke oven, an offtake main therefrom, an exhauster connected to said oven offtake main, a bell floating in liquid and provided with a buoyancy chamber which increases in buoyant effect as the depth of immersion of such bell increases, a connection from an inclosed space vertically on one side of said bell to said oven offtake main so that the pressure in such space corresponds to that in said oven offtake main, means for varying the pressure condition maintained in said offtake main by said exhauster, and means operated by the rise and fall of said bell and controlling the operation of said pressure-varying means, said means operated by said bell having a zero range of inoperative travel.

10. In combination, a coke oven, an offtake main therefrom, an exhauster connected to said oven offtake main, a bell floating in liquid, means for producing on said bell a vertically acting force varying with the extent to which the bell is immersed, a connection from an inclosed space vertically on one side of said bell to said oven offtake main so that the pressure in such space corresponds to that in said oven offtake main, means for varying the pressure condition maintained in said offtake main by said exhauster, and means operated by the rise and fall of said bell and controlling the operation of said pressure-varying means, said means operated by said bell having a zero range of inoperative travel.

11. In combination, a chamber, a control device for varying the pressure condition in said chamber, a device operated in one direction by a spring and in the other by fluid pressure and connected to said control device for operating it, means for supplying compressible fluid under pressure to said device operated by fluid pressure, a control valve for controlling the pressure of the supply of compressible fluid to said device operated by fluid pressure, and a bell floating in liquid and vertically movable in response to the pressure in said chamber for operating said control valve, said bell having a buoyancy chamber which increases in buoyant effect as the depth of immersion of the bell increases.

12. In combination, a chamber, a control device for varying the pressure condition in said chamber, a device operated by fluid pressure and connected to said control device for operating it, said device operated by fluid pressure moving in opposite directions upon the rise and fall of the fluid pressure supplied to it, a source of fluid pressure, a control valve through which said device operated by fluid pressure is connected to said source of fluid pressure and to a waste, said control valve at all times connecting said device operated by fluid pressure to either said source of fluid pressure or to said waste or to both but varying the relative sizes of the connection to the source of fluid pressure and to the waste, and a bell floating in liquid and vertically movable in response to the pressure in said chamber for operating said control valve, said bell having a buoyancy chamber which increases in buoyant effect as the depth of immersion of the bell increases.

13. In combination, a chamber, a control device for varying the pressure condition in said chamber, a device operated by fluid pressure and connected to said control device for operating it, said device operated by fluid pressure moving in opposite directions upon the rise and fall of the fluid pressure supplied to it, a source of compressible fluid under pressure, a control valve through which said device operated by fluid pressure is connected to said source of compressible fluid under pressure and to a waste, said control valve at all times connecting said device operated by fluid pressure to either said source of compressible fluid under pressure or to said waste or to both but varying the relative sizes of the connection to the source of compressible fluid under pressure and to the waste, and a bell floating in liquid and vertically movable in response to the pressure in said chamber for operating said control valve, said bell having a buoyancy chamber which increases in buoyant effect as the depth of immersion of the bell increases.

In witness whereof, I have hereunto set my hand at Indianapolis, Indiana, this sixth day of January, A. D. one thousand nine hundred and sixteen.

WILLIAM H. WRIGHT.